United States Patent [19]

Fjeldsted

[11] 4,380,363

[45] Apr. 19, 1983

[54] FOUR ELEMENT INFRARED OBJECTIVE LENS

[75] Inventor: Thomas P. Fjeldsted, West Covina, Calif.

[73] Assignee: Rockwell International Corporation, El Segundo, Calif.

[21] Appl. No.: 251,026

[22] Filed: Apr. 3, 1981

[51] Int. Cl.³ .............................................. G02B 1/00
[52] U.S. Cl. .................................................. 350/1.3
[58] Field of Search .......................................... 350/1.3

[56] References Cited

U.S. PATENT DOCUMENTS 3,321,264  5/1967  Sijgers et al. ...................... 350/1.3

Primary Examiner—Bruce Y. Arnold
Attorney, Agent, or Firm—H. Fredrick Hamann; James F. Kirk

[57] ABSTRACT

A four element infrared lens design is provided having lenses of crystalline semiconductor materials such as silicon and germanium. The system is designed to have an f/1.5 speed corrected over the spectral region of 3.3 to 4.2 microns, and to reduce field curvature produced by projecting an image on a flat detector. A particular object of the design is to minimize the effect of narcissus and loss of resolution.

2 Claims, 1 Drawing Figure

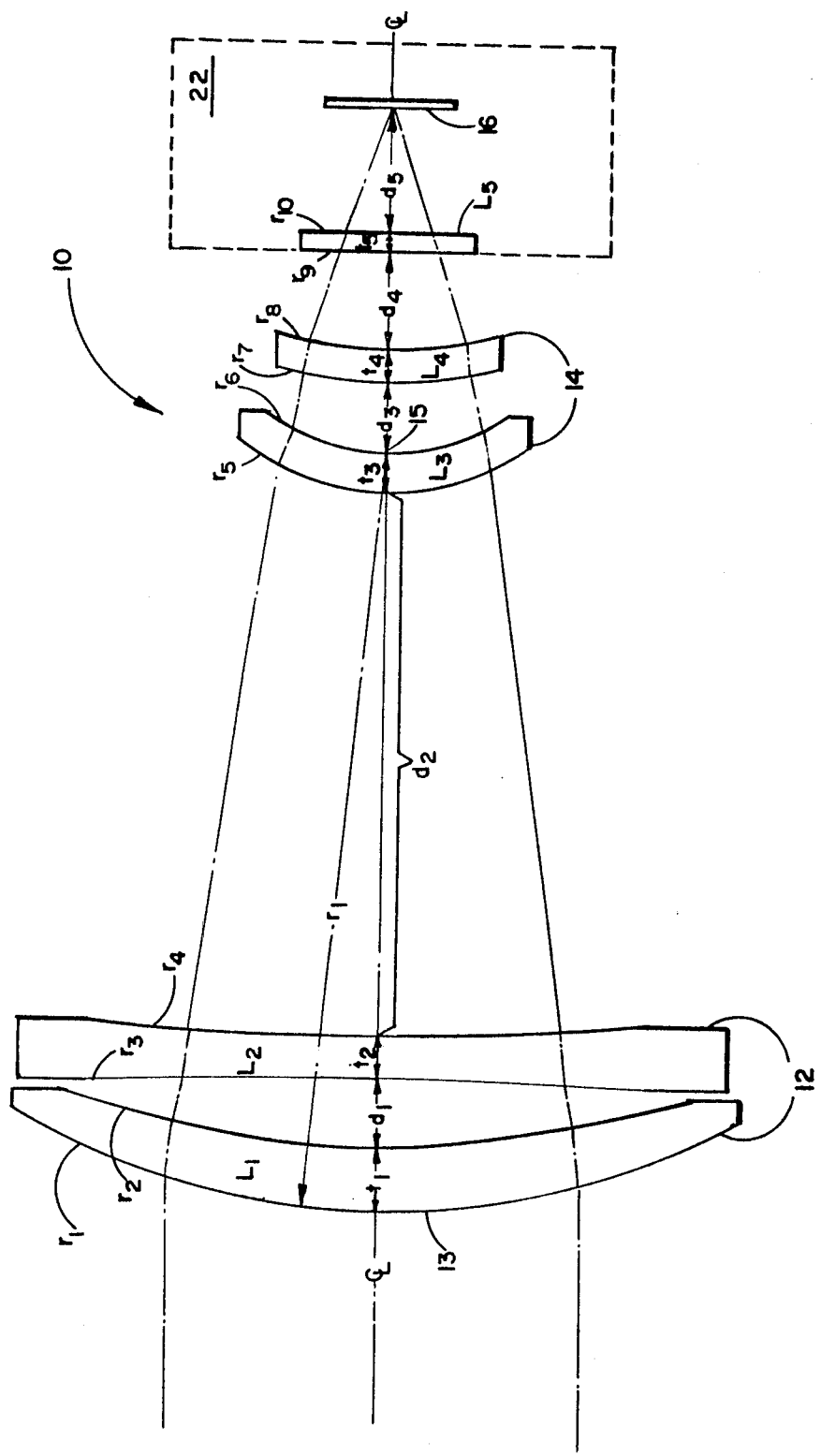

FOUR ELEMENT INFRARED OBJECTIVE LENS

BACKGROUND OF THE INVENTION

1. Field of the Invention

This invention relates to objective lens systems having multiple lenses of crystalline semiconductor materials such as silicon and germanium. The invention lens is particularly adapted for use in light weight portable FLIR (Forward Looking Infrared) surveillance systems.

2. Description of the Prior Art

Four element infrared objective lens systems having axially aligned optical elements of silicon and germanium are known and described in U.S. Pat. No. 3,321,264 to H. K. Sijgers et al, issued May 23, 1967. Lens systems of this type find particular application in scanning infrared systems. These systems typically employ a detector upon which an image is focussed by the invention lens system. The detector used is typically flat. Prior art lens designs are best suited for projecting an image on a curved field of curvature. The present four element infrared objective is designed to minimize narcissus on the detector and forming a flat field of curvature.

Infrared objective lens systems used to project an image through a cold stop on to a flat detector forming an image plane in a cryogenically cooled space have the problem of re-imaging the detector onto itself. The mirror image of itself is due to reflections from the surfaces of lenses within the objective lens system. The image of the detector when sensed by the detector along with the intended image results in a loss of resolution. Re-imaging of the detector onto the detector by the infrared lens is an effect referred to as narcissus. The invention four element infrared objective lens is designed to effectively minimize the effect of narcissus while maintaining a flat field of curvature.

SUMMARY OF THE INVENTION

It is a major objective of this invention to reduce field curvature produced by projecting an image onto a flat detector. Another objective of this invention is to minimize loss of resolution.

Another particular objective of this invention is to minimize the effect of narcissus. It is a highly particular objective of this invention to produce a four element infrared objective having an f/1.5 speed, corrected over the spectral region of 3.3 to 4.2 microns.

These and other objectives of the invention are realized in a four element infrared objective lens having a forward assemblage and a rearward assemblage, the forward assemblage including a lens L1 composed of silicon and a lens L2 composed of germanium, the rearward assemblage including a lens L3 composed of germanium, and a lens L4 composed of silicon, the lenses L1 through L4 being axially aligned and followed by window L5 of sapphire, the lens L1 having forward and rearward radii r1 and r2, respectively, the lens L2 having forward and rearward radii r3 and r4, respectively, the lens L3 having forward and rearward radii r5 and r6, respectively, the lens L4 having forward and rearward radii r7 and r8, respectively, the window L5 having forward and rearward radii r9 and r10, respectively, the thickness of lens L1, L2, L3, L4 and window L5 being designated by t1, t2, t3, t4 and t5, respectively, the distances between the lens L1 and L2 being designated d1, the distance between the lens L2 and L3 being designated d2, the distance between the lens L3 and L4 being designated d3, the distance between lens L4 and window L5 being designated d4, the relationship among said lenses being as set forth in the table following:

TABLE

| Lens Element | Radius | Thickness and Spacing | Material |
|---|---|---|---|
| $L_1$ | $r_1 = 1.838 \pm 0.002$ | $t_1 = 0.125 \pm 0.004$ | Si |
|  | $r_2 = 2.674 \pm 0.005$ | $d_1 = 0.125 \pm 0.006$ | Air |
| $L_2$ | $r_3 = 121.0 \pm 2.4$ | $t_2 = 0.125 \pm 0.010$ | Ge |
|  | $r_4 = 14.882 \pm 0.031$ | $d_2 = 1.217 \pm 0.020$ | Air |
| $L_3$ | $r_5 = 0.587 \pm 0.001$ | $t_3 = 0.100 \pm 0.002$ | Ge |
|  | $r_6 = 0.504 \pm 0.001$ | $d_3 = 0.129 \pm 0.004$ | Air |
| $L_4$ | $r_7 = 0.907 \pm 0.001$ | $t_4 = 0.100 \pm 0.002$ | Si |
|  | $r_8 = 1.289 \pm 0.002$ | $d_4 = 0.200 \pm 0.030$ | Air |
| $L_5$ | $r_9 = \infty$ | $t_5 = 0.040 \pm 0.005$ | SA |
|  | $r_{10} = \infty$ |  |  | given the equivalent focal length f' as equal to 1.43 and $r_1, r_2, r_3, r_4, r_5, r_6, r_7, r_8$ being positive. f' is the equivalent focal length of the lens system as defined in MIL-STD-150A.

BRIEF DESCRIPTION OF THE DRAWING

The invention will be further described as to an illustrative embodiment thereof in conjunction with the attached drawing in which:

FIG. 1 is a side elevation of the invention four element infrared lens.

DESCRIPTION OF THE PREFERRED EMBODIMENT

Now referring to FIG. 1 of the drawing, the four element infrared lens system 10, comprises a forward assemblage 12, and a rearward assemblage 14. Forward assemblage 12 includes positive lens elements L1 and L2, composed of silicon and germanium, respectively. Rearward assemblage 14 includes positive lens elements L3 and L4, composed of germanium and silicon, respectively. The germanium and silicon are both of optical quality. Chief Ray 19 is shown passing through each lens vertex.

Lens L1 is shown as having positive radii r1 and r2, respectively. Lens L2 is shown as having positive radii r3 and r4, respectively. Lens L3 is shown as having positive radii r5 and r6, respectively. Lens L4 is shown as having positive radii r7 and r8, respectively. Window L5, of sapphire, is flat and is shown as having infinite radii r9 and r10, respectively. A positive radius, as illustrated in FIG. 1 by $r_1$, has a center of curvature to the right of the lens surface 13 described. The thicknesses of L1, L2, L3, L4 and L5 are designated t1, t2, t3, t4, and t5, respectively. The distance between lenses L1 and L2 is designated d1. The distance between lenses L2 and L3 is designated d2. The distance between lenses L3 and L4 is designated d3. The distance between lens L4 and window L5 is designated d4. The distance between window L5 and image plane 16 is d5, the relationship among the lenses being as set forth in the Table following:

TABLE

| Lens Element | Radius | Thickness and Spacing | Material |
|---|---|---|---|
| $L_1$ | $r_1 = 1.838 \pm 0.002$ | $t_1 = 0.125 \pm 0.004$ | Si |
|  | $r_2 = 2.674 \pm 0.005$ | $d_1 = 0.125 \pm 0.006$ | Air |
| $L_2$ | $r_3 = 121.0 \pm 2.4$ | $t_2 = 0.125 \pm 0.010$ | Ge |
|  | $r_4 = 14.882 \pm 0.031$ | $d_2 = 1.217 \pm 0.020$ | Air |
| $L_3$ | $r_5 = 0.587 \pm 0.001$ | $t_3 = 0.100 \pm 0.002$ | Ge | given the equivalent focal length f' as equal to 1.43 inches and $r_1, r_2, r_3, r_4, r_5, r_6, r_7, r_8$ being positive.

The design of the above Table follows from initial infrared lens specifications and successful ray tracing approximations, which when applied provide optimum ranges outside of which the lens system would become unacceptable in view of the stated specifications. The lens materials and configurations of FIG. 1 and Table 1 produce an optimum response to the specifications in a four element lens system, corrected over the spectral region of 3.3 to 4.2 microns with low narcissus. The design consists of two silicon-germanium, air-spaced doublets placed back to back to correct for lateral color, as shown in FIG. 1. The performance of this f/1.5 lens approaches the diffraction limit over the two and one-half degree by five degree field of view as projected on the image plane, as defined in MIL STD 150A. Signal features include: the four selected optical materials, lenses all having surfaces of a positive radii of curvature; the window L5 formed of sapphire; a flat image plane within an evacuated dewar enclosure 22; and the four element lens acting to pass infrared rays 18, 19 and 20 through the sapphire window L5 to the flat image plane 16 within the evacuated dewar enclosure 22.

There is thus provided a four element infrared objective lens system, having axially aligned optical elements of silicon and germanium. In the preferred embodiment of the invention objective lens system defined by the foregoing Table, the equivalent focal length f' is 1.43 inches, the wavelength region is 3.3 to 4.2 microns, and the field of view more than two and one-half degrees by five degrees for a flat field.

The description provided is intended to be illustrative only and is not intended to be limitative. Those skilled in the art may conceive of modifications to the figure disclosed. However, any such modifications which fall within the purview of the description are intended to be included therein as well. The scope of this invention shall be determined from the scope of the following claims including their equivalents.

I claim:

1. An infrared lens system comprising:
a forward assemblage and a rearward assemblage,
said forward assemblage including a lens L1 composed of silicon and a lens L2 composed of germanium,
said rearward assemblage including a lens L3 composed of germanium, a lens L4 composed of silicon and a window L5 of sapphire,
said lens L1 having forward and rearward radii r1 and r2, respectively,
said lens L2 having forward and rearward radii r3 and r4, respectively,
said lens L3 having forward and rearward radii r5 and r6, respectively,
said lens L4 having forward and rearward radii r7 and r8, respectively,
said window L5 having forward and rearward radii r9 and r10, respectively,
the thickness of said lens L1, L2, L3, L4, and window L5 being designated by t1, t2, t3, t4, and t5, respectively,
the distances between said lens L1 and L2 being designated d1,
the distance between said lens L2 and L3 being designated d2,
the distance between said lens L3 and L4 being designated d3,
the distance between said lens L4 and window L5 being designated by d4,
the relationship among said lenses being as set forth in the table following:

TABLE

| Lens Element | Radius | Thickness and Spacing | Material |
|---|---|---|---|
| $L_1$ | $r_1 = 1.838 \pm 0.002$ | $t_1 = 0.125 \pm 0.004$ | Si |
|  | $r_2 = 2.674 \pm 0.005$ | $d_1 = 0.125 \pm 0.006$ | Air |
| $L_2$ | $r_3 = 121.0 \pm 2.4$ | $t_2 = 0.125 \pm 0.010$ | Ge |
|  | $r_4 = 14.882 \pm 0.031$ | $d_2 = 1.217 \pm 0.020$ | Air |
| $L_3$ | $r_5 = 0.587 \pm 0.001$ | $t_3 = 0.100 \pm 0.002$ | Ge |
|  | $r_6 = 0.504 \pm 0.001$ | $d_3 = 0.129 \pm 0.004$ | Air |
| $L_4$ | $r_7 = 0.907 \pm 0.001$ | $t_4 = 0.100 \pm 0.002$ | Si |
|  | $r_8 = 1.289 \pm 0.002$ | $d_4 = 0.200 \pm 0.030$ | Air |
| $L_5$ | $r_9 = \infty$ | $t_5 = 0.040 \pm 0.005$ | SA |
|  | $r_{10} = \infty$ |  |  | given the equivalent focal length f' as equal to 1.43 and $r_1, r_2, r_3, r_4, r_5, r_6, r_7, r_8$ being positive.

2. The lens system of claim 1, wherein all dimensions in the table are in inches, and the equivalent focal length f' is equal to 1.43 inches.

* * * * *